United States Patent
Drukin

(10) Patent No.: US 7,552,124 B2
(45) Date of Patent: Jun. 23, 2009

(54) NATURAL LANGUAGE FOR PROGRAMMING A SPECIALIZED COMPUTING SYSTEM

(75) Inventor: Vladimir Drukin, Raanana (IL)

(73) Assignee: IXI Mobile (R&D), Ltd. (IL)

( * ) Notice: Subject to any disclaimer, the term of this patent is extended or adjusted under 35 U.S.C. 154(b) by 560 days.

(21) Appl. No.: 10/872,289

(22) Filed: Jun. 17, 2004

(65) Prior Publication Data

US 2005/0283467 A1    Dec. 22, 2005

(51) Int. Cl.
*G06F 17/30*    (2006.01)
(52) U.S. Cl. .................... 707/10; 707/100; 707/101; 707/102
(58) Field of Classification Search ................. 707/200, 707/100, 101, 10; 717/172–177
See application file for complete search history.

(56) References Cited

U.S. PATENT DOCUMENTS

| | | | |
|---|---|---|---|
| 6,766,320 B1 * | 7/2004 | Wang et al. ............... | 707/5 |
| 7,027,975 B1 * | 4/2006 | Pazandak et al. .......... | 704/9 |
| 2003/0074184 A1 * | 4/2003 | Hayosh et al. ............. | 704/1 |
| 2003/0083861 A1 * | 5/2003 | Weise ........................ | 704/9 |

* cited by examiner

*Primary Examiner*—Khanh B Pham
(74) *Attorney, Agent, or Firm*—Century IP Group, Inc.; F. Jason Far-hadian, Esq.

(57) ABSTRACT

A method for programming a mobile communication device based on a high-level code comprising operative language is provided. The method comprises parsing the high-level code for keywords to recognize the operative language; determining at least one operation associated with the operative language; determining whether high-level code comprises keywords defining one or more relationships and conditions corresponding to the operative language; and producing an executable code that can be executed by a microcontroller of the mobile communication device to perform the respective operation associated with the operative language, wherein the high-level code comprises at least one sentence formatted in accordance with a first context.

10 Claims, 3 Drawing Sheets

Hardware Environment 1110

Software Environment 1120

NATURAL LANGUAGE FOR PROGRAMMING A SPECIALIZED COMPUTING SYSTEM

BACKGROUND

1. Field of Invention

The present invention relates generally to specialized computing systems and, more particularly, to a system and method for programming a mobile communication device using a high-level natural language.

2. Copyright & Trademark Notices

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

3. Related Art

Computing systems continue to dramatically enhance our quality of life. Many specialized computing systems, such as mobile communication devices (e.g., cellular phones) and data organizers (e.g., personal digital assistants (PDAs)) are particularly popular these days. The technically savvy consumers can operate these specialized devices to perform many operational features for which the devices are configured.

For example, some cellular phones have special features that allow a consumer to program the phone to produce a special tone, if a call is received from a designated phone number (i.e., audio caller identification). Other programming features may include voice-activated dialing, voice mail management, or other functions that may be configured in accordance with occurrence of particular conditions and events.

Unfortunately for the less technically inclined consumer, most of said operational features are hardly usable, because the consumer either does not possess the skill or cannot learn the requisite steps to properly program the device to perform various functions. Generally, most consumers find it tedious to program the device to perform the special features, and therefore forgo using said features altogether.

Thus, a more natural method for programming specialized computing systems is desirable to promote use and enhance the user's level of enjoyment.

SUMMARY

The present disclosure is directed to a system and corresponding methods that facilitate programming a mobile communication device or other specialized computing device using a natural language.

For purposes of summarizing, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, a method for programming a mobile communication device based on a high-level code comprising operative language comprises parsing the high-level code for keywords to recognize the operative language; determining at least one operation associated with the operative language; determining whether high-level code comprises keywords defining one or more relationships and conditions corresponding to the operative language; and producing an executable code that can be executed by a microcontroller of the mobile communication device to perform the respective operation associated with the operative language, wherein the high-level code comprises at least one sentence formatted in accordance with a first context.

In one embodiment, application software is executed on the mobile communication device performs the parsing and determining steps, when the high-level code comprises a first level of complexity. In another embodiment, application software executed on a network server connected to the mobile communication device performs the parsing and determining steps, when the high-level code comprises a second level of complexity. In yet another embodiment, application software executed on a distributed environment, comprising the mobile communication device and a network server connected to the mobile communication device, performs the parsing and determining steps.

The high-level code is transmitted to the network server to produce the executable code after the network server performs the parsing and determining steps. The executable code is transmitted to the mobile communication device to be executed by the microcontroller of the mobile communication device. In one embodiment, at least one sentence comprises one or more keywords and the first context is a natural language context. The high-level code may be contained in a script. The script is written by a user of the mobile communication device.

In accordance with another embodiment, a system for programming a mobile communication device based on a high-level code comprising operative language is provided. The system comprises means for parsing the high-level code for keywords to recognize the operative language; means for determining at least one operation associated with the operative language; means for determining whether high-level code comprises keywords defining one or more relationships and conditions corresponding to the operative language; and means for producing an executable code that can be executed by a microcontroller of the mobile communication device to perform the respective operation associated with the operative language, wherein the high-level code comprises at least one sentence formatted in accordance with a first context.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION

An electronic system and corresponding methods, according to an embodiment of the present invention, facilitate and provide a method and system for programming a specialized computing device.

The terms electronic services, services, and online services are used interchangeably herein. The services provided by the system of this invention, in one or more embodiments, are provided by a service provider. A service provider is an entity that operates and maintains the computing systems and environment, such as server systems and infrastructures that enable the delivery of information. Typically, server architecture includes components (e.g., hardware, software, and communication lines) that store and offer electronic or online services.

In the following, numerous specific details are set forth to provide a thorough description of various embodiments of the invention. Certain embodiments of the invention may be practiced without these specific details or with some variations in detail. In some instances, features not pertinent to the novelty of the system are described in less detail so as not to obscure other aspects of the invention.

Figure 1:
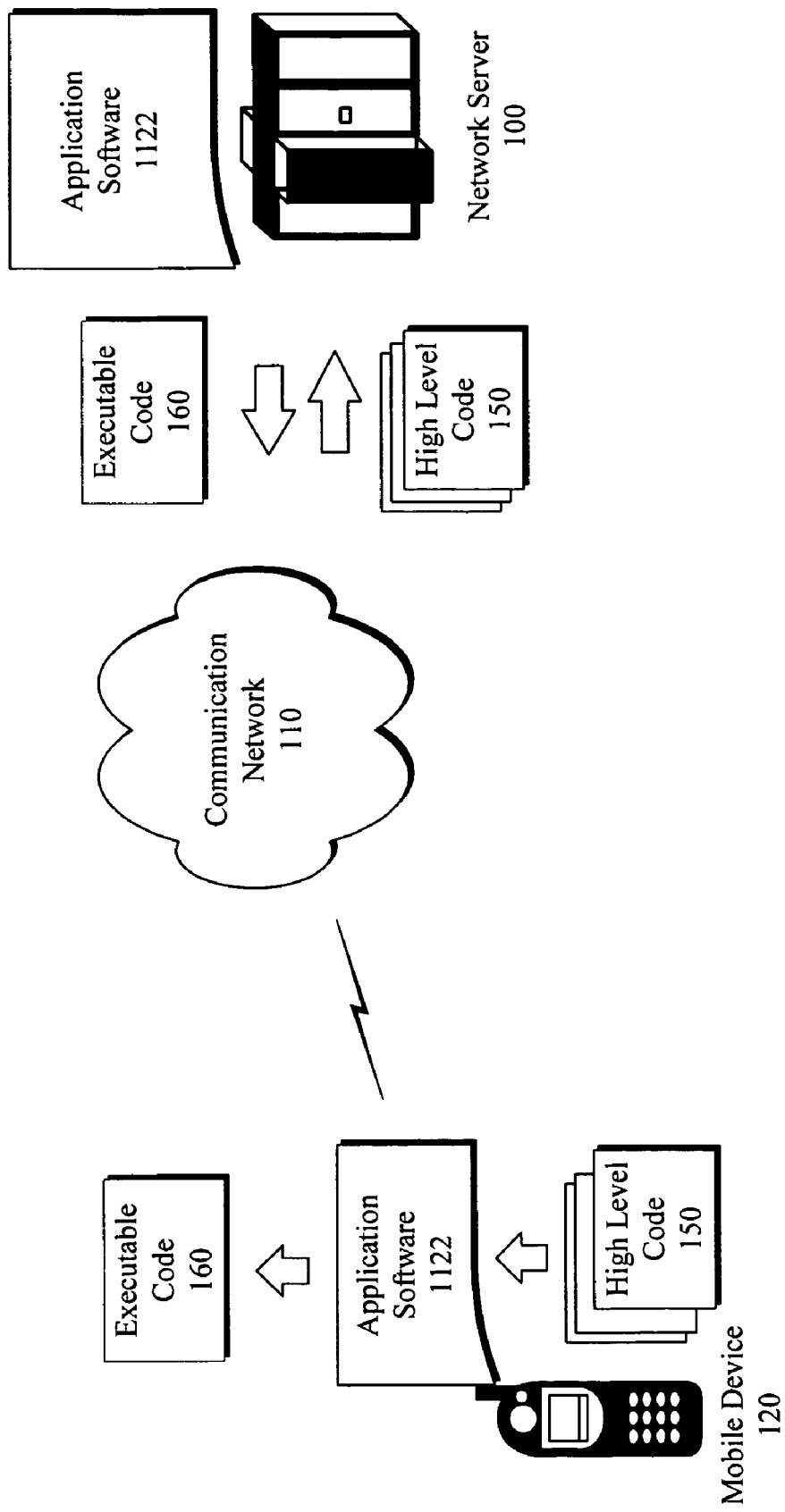
FIG. 1 illustrates an exemplary communications environment, in accordance with one or more embodiments of the invention.

Referring to the drawings, FIG. 1 illustrates an exemplary communications environment in which the system of the present invention may operate. In accordance with one aspect of the invention, the system environment comprises a network server 100, a communication network 110, and a mobile device 120. The network server 100 and mobile device 120 are connected by way of the communication network 110. The terms "connected," "coupled," or any variant thereof, mean any connection or coupling, either direct or indirect, between two or more elements. The coupling or connection between the elements can be physical, logical, or a combination thereof.

In one embodiment, communication network 110 provides the medium and infrastructure for transmitting digital or analog signals between network server 100 and mobile device 120. In certain embodiments, mobile device 120 is a cellular telephone and communication network 110 is a wireless telephone network, for example. Mobile device 120, network server 100 and communication network 110, however, may be implemented over any type of mobile, fixed, wired or wireless communication technology (e.g., landline telephony, cellular, radio, radar, infrared, etc.).

One of ordinary skill in the art will appreciate that communication network 110 may advantageously be comprised of one or a combination of various types of networks without detracting from the scope of the invention. Such networks can, for example, comprise personal area networks (PANs), local area networks (LANs), wide area networks (WANs), public, private or secure networks, value-added networks, interactive television networks, wireless communications networks, two-way cable networks, satellite networks, interactive kiosk networks, cellular networks, personal mobile gateways (PMGs) and/or any other suitable communications networks that can provide a means of communication between mobile device 120 and network server 100.

In some embodiments, communication network 110 can be a part of the world wide web (i.e., the Internet). The Internet, in a well-known manner, connects millions of computers world wide through standard common addressing systems and communications protocols (e.g., Transmission Control Protocol/Internet Protocol (TCP/IP), HyperText Transport Protocol) creating a vast communications network.

In either context, mobile device 120 can communicate with network server 100 to send and receive electronic packets of information, in form of electronic requests and responses. In a particular embodiment, a high-level code 150 written by a user and stored in mobile device 120's memory, for example, may be transmitted over communication network 110 from mobile device 120 to network server 100 for processing.

High-level code 150, in a preferred embodiment, comprises text formatted in the context of a natural language (e.g., English, French, Spanish, Japanese, etc.). High-level code 150 may comprise one or more sentences, wherein each sentence comprises at least one operative language (i.e. keyword) defining an instruction for a function or an operation to be performed. In one embodiment, the sentences also comprise keywords defining conditions or relationships based on which an operation is performed.

To illustrate, an exemplary script written by a user in a natural language may include a sentence such as "Transfer call to voice mail if call is from Bob". The operative language (i.e., keyword or instruction) in the sentence is "transfer". The condition is "if call is from Bob". Keywords such as "if" or the like are used to indicate a condition or relationship. Application software 1122 can process sentences written in natural language to recognize the included keywords.

In one or more embodiments, the operations that can be performed by mobile device 120 are limited because mobile device 120 is a specialized computing system developed and manufactured to perform particular functions or operations (e.g., related to making and receiving telephone calls). Therefore, the corresponding conditions and relationships associated with the particular functions fall within a finite set for each operation. For example, the conditions associated with an operation to receive a call may include answering the call, transferring the call to voice mail, or disconnecting the call.

Accordingly, application software 1122 can act as a natural language compiler to processes high-level code 150 to control the operation of mobile device 120 based a defined set of conditions. In one embodiment, as shown in FIG. 1, depending on the level of sophistication and complexity, high-level code 150 may be processed by application software 1122 to produce executable code 160.

Thus, if high-level code 150 comprises a complex set of instructions, then high-level code 150 is transmitted to network server 100, so that a more powerful system is utilized to process and compile high-level code 150. Therefore, in one embodiment, application software 1122 or a portion thereof is installed and executed on network server 100 to process high-level code 150 and to produce executable code 160. Executable code 160 is then transmitted over communication network 110 to mobile device 120.

Alternatively, if high-level code 150 comprises a less complex structure, then application software 1122 or a portion thereof is installed and executed on mobile device 120 to process high-level code 150 to produce executable code 160, without the need for transferring high-level code 150 to a more powerful processing environment implemented on network server 100. As such, simple instructions implemented in a natural language context can be processed more efficiently by a locally executed version of application software 1122. In some embodiments, depending on implementation, a first part of high-level code 150 is processed by application software 1122 executed on mobile device 120 and a second part of high-level code 150 is processed by application software 1122 executed on network server 100.

Executable code 160, according to one embodiment, comprises binary or hex code that can be processed by a microcontroller or processor embedded in mobile device 120 to cause mobile device 120 to perform the requisite operations according to the operational language included in high-level code 150. Exemplary operational language may include an instruction to turn mobile device 120 on or off at a certain time, to set an alarm with a particular tune, to display a particular image when a call from an identifiable party is received, to automatically place a call to a designated destination, to forward received text messages from an identifiable source to a designated email account, and numerous other telephony related operations.

In accordance with one embodiment, in addition to mobile device 120 or network server 100, application software 1122 may be installed or executed on at least one of a third party portal, a service provider or a combination of said systems. As used herein, the terms mobile device, third party portal, service provider and communication network are to be viewed as designations of one or more computing environments that comprise application, client or server software for servicing requests submitted by respective software included in devices or other computing systems connected there to. These terms are not to be otherwise limiting in any manner. Application software 1122, for example, may be comprised of one or more modules that execute on one or more computing systems.

Figure 2:
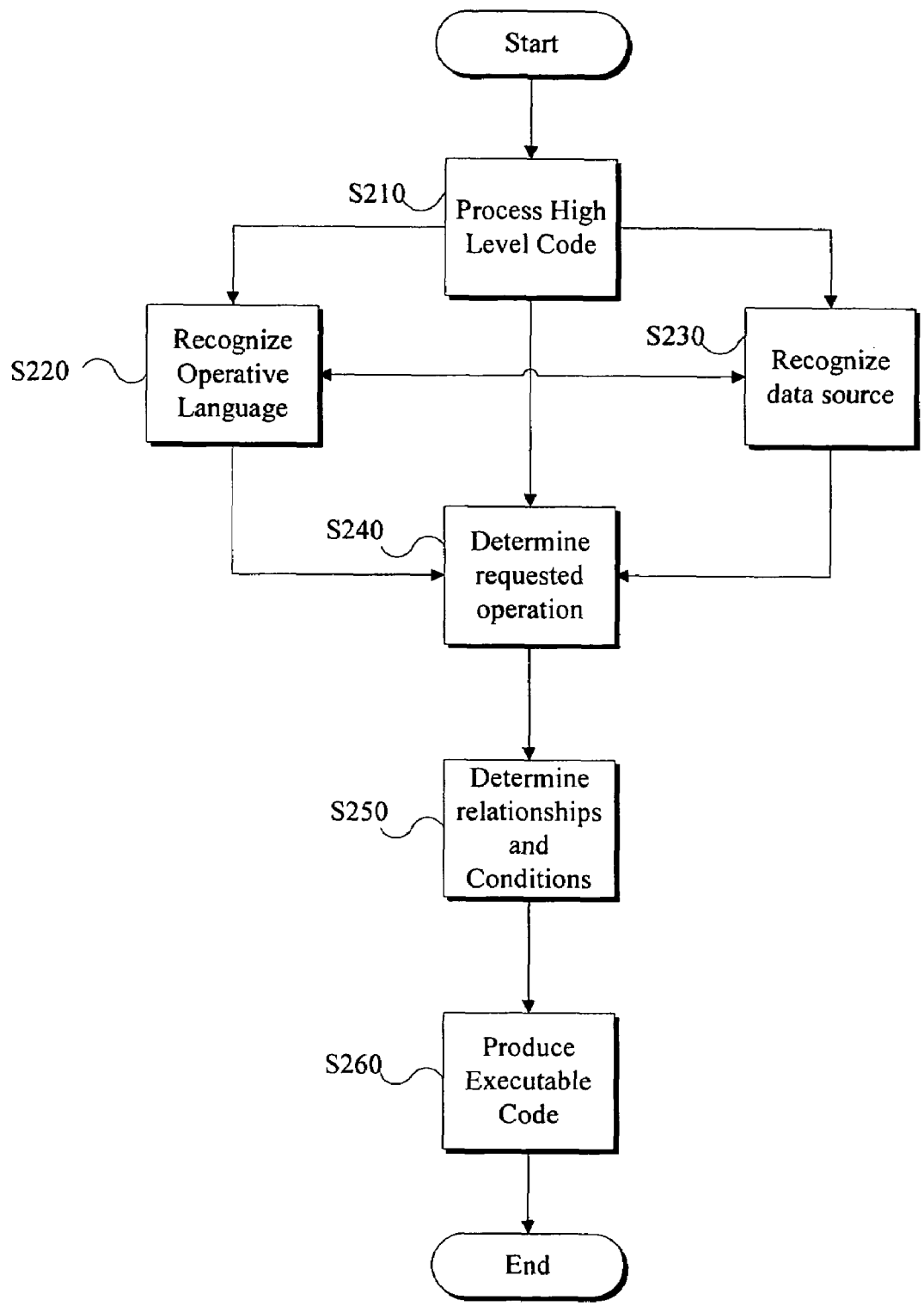
FIG. 2 is a flow diagram of a method for providing a natural programming language for a specialized computing device, in accordance with one or more embodiments.

Referring to FIG. 2, once a user has edited and stored a high-level code written in a natural language (e.g., "Transfer all text messages from Mary to my Yahoo account"), by way of interacting with mobile device 120's user interface, for example, application software 1122 processes the high-level code 150 (S210). Thus, application software 1122 pareses high-level code 150 for keywords in an attempt to recognize any operative language included in high-level code 150 (S220). For example, application software 1122 may determine that "transfer" as used in the above example is the operative language for performing a function, namely transferring a certain content received by mobile device 120 to a destination.

Application software 1122 is also be implemented to parse high-level code 150 for keywords in an attempt to recognize any data sources (S230). For example, application software 1122 may search mobile device 120's internal memory to determine if a data source (e.g., a contacts database) stores information associated with the name "Mary", so that when a text message is received from "Mary" the corresponding function or operation defined in high-level code 150 is performed.

Once application software 1122 parses high-level code 150 for the particular keywords, then application software 1122 determines the requested operation that is to be performed in accordance with the recognized keywords (S240). As noted above, for example, the keyword "transfer" would indicate that a transfer operation is to be performed. Furthermore, application software 1122 determines the relationships and conditions that are to be taken into account for the operation to be performed (S250). That is, the "transfer" operation is, for example, to be performed when a particular condition, namely "receipt of a text message from Mary", is satisfied.

Once the operations, conditions, and relationships are recognized, then application software 1122 produces executable code 160 (S260). A processor of mobile device 120 executes executable code 260 in order to accomplish the results contemplated according to instructions in high-level code 150. Thus, for example, mobile device 120 will operate to monitor text messages received from various sources in order to determine if a message is from "Mary", for example, and transfers such messages to a designated destination, such as a Yahoo email account, for example, instead of storing the messages in mobile device 120's memory.

As such, a user can manipulate the operation of mobile device 120 by writing a high-level code 150 in a natural language (e.g., "if Eugene calls on Saturday morning, forward call to voice mail" or "if Bob calls anytime then show picture bob.jpg and play ring tone ring1.wav").

Application software 1122 may be implemented, installed or executed on a device or a system other than mobile device 120. For example, application software 1122 or its components may be implemented, installed, and executed either in a singular or in a distributed environment. That is, certain components of the application software may be installed and executed on mobile device 120, while other components may be executed and installed on a third party portal, one or more network servers 100, a PMG server or other systems attached thereto.

In one or more embodiments of the system, network server 100, communication network 110, and mobile device 120 comprise a controlled computing system environment that can be presented largely in terms of hardware components and software code executed to perform processes that achieve the results contemplated by the system of the present invention. A more detailed description of such system environment is provided below with reference to FIGS. 3A and 3B.

As shown, a computing system environment is composed of two environments, a hardware environment 1110 and a software environment 1120. The hardware environment 1110 comprises the machinery and equipment that provide an execution environment for the software. The software provides the execution instructions for the hardware. It should be noted that certain hardware and software components may be interchangeably implemented in either form, in accordance with different embodiments.

Software environment 1120 is divided into two major classes comprising system software 1121 and application software 1122. System software 1121 comprises control programs, such as the operating system (OS) and information management systems that instruct the hardware how to function and process information.

Application software 1122 is a program that performs a specific task. In embodiments of the invention, system and application software are implemented and executed on one or more hardware environments to program a mobile device using a high-level code.

Figure 3A:
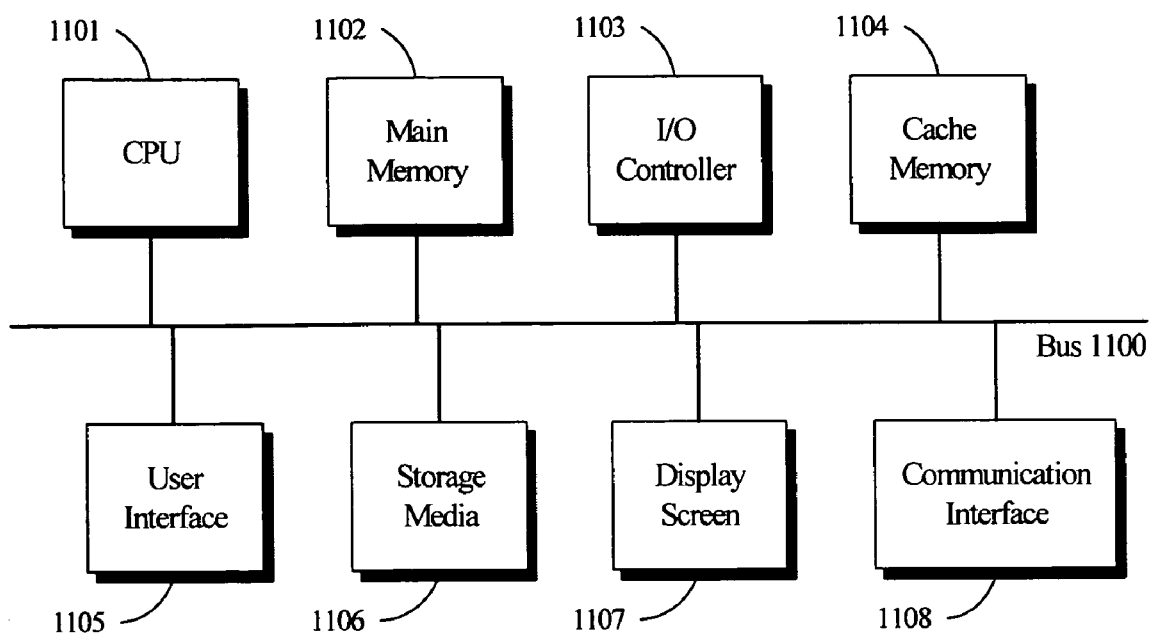
FIGS. 3A and 3B are block diagrams of hardware and software environments in which a system of the present invention may operate, in accordance with one or more embodiments.

Referring to FIG. 3A, an embodiment of application software 1122 can be implemented as computer software in the form of computer readable code executed on a general purpose hardware environment 1110 that comprises a central processor unit (CPU) 1101, a main memory 1102, an input/output controller 1103, optional cache memory 1104, a user interface 1105 (e.g., keypad, pointing device, etc.), storage media 1106 (e.g., hard drive, memory, etc.), a display screen 1107, a communication interface 1108 (e.g., a network card, a modem, or an integrated services digital network (ISDN) card, etc.), and a system synchronizer (e.g., a clock).

Processor 1101 may or may not include cache memory 1104 utilized for storing frequently accessed information. A communication mechanism, such as a bi-directional data bus 1100, can be utilized to provide for means of communication between system components. Hardware Environment 1110 is capable of communicating with local or remotes systems connected to a communications network (e.g., a PAN or a WAN) through communication interface 1108.

In one or more embodiments, hardware environment 1110 may not include all the above components, or may include additional components for additional functionality or utility. For example, hardware environment 1110 can be a laptop computer or other portable computing device that can send messages and receive data through communication interface 1108. Hardware environment 1110 may also be embodied in an embedded system such as a set-top box, a personal data assistant (PDA), a wireless communication unit (e.g., cellular phone), or other similar hardware platforms that have information processing and/or data storage and communication capabilities. For example, in embodiments of the system mobile device 120 may be a PMG phone or equivalent.

In embodiments of the system, communication interface 1108 can send and receive electrical, electromagnetic, or optical signals that carry digital data streams representing various types of information including program code. If communication is established via the Internet, hardware environment 1110 may transmit program code through an Internet connection. Central processor unit 1101 or stored in storage media 1106 or other non-volatile storage for later execution can execute the program code.

Program code may be transmitted via a carrier wave or may be embodied in any other form of computer program product. A computer program product comprises a medium configured to store or transport computer readable code or a medium in which computer readable code may be embedded. Some examples of computer program products are CD-ROM disks, ROM cards, floppy disks, magnetic tapes, computer hard drives, and network server systems.

In one or more embodiments of the invention, processor 1101 is a microprocessor manufactured by Motorola, Qualcomm, Intel, Texas Instruments, or Sun Microsystems Corporations. The named processors are for the purpose of example only. Any other suitable microprocessor, microcontroller, or microcomputer may be utilized.

Figure 3B:
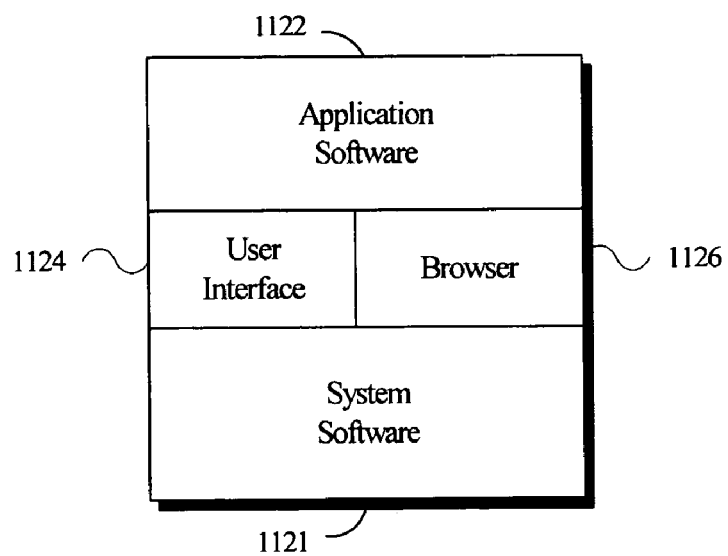

Referring to FIG. 3B, software environment 1120 is stored in storage media 1106 and is loaded into memory 1102 prior to execution. Software environment 1120 comprises system software 1121 and application software 1122. Depending on system implementation, certain aspects of software environment 1120 can be loaded on one or more hardware environments 1110.

System software 1121 comprises control software such as an operating system that controls the low-level operations of hardware environment 1110. Low-level operations comprise the management of the system's resources such as memory allocation, file swapping, and other core computing tasks. In one or more embodiments of the invention, the operating system comprises at least one of Symbian, Nucleus, Microsoft Windows, Palm, or Macintosh operating systems. However, any other suitable operating system may be utilized.

Application software 1122 can comprise one or more computer programs that are executed on top of system software 1121 after being loaded from storage media 1106 into memory 1102. In a client-server architecture, application software 1122 may comprise client software and server software. Referring to FIG. 1, for example, in one embodiment of the invention, client software is executed on mobile device 120 and server software is executed on network server 100.

Software environment 1120 may also comprise web browser software 1126 for communicating with the Internet. Further, software environment 1120 may comprise a user interface 1124 (e.g., a Graphical User Interface (GUI)) for receiving user commands and data. The commands and data received are processed by the software applications that run on the hardware environment 1110. The hardware and software architectures and environments described above are for purposes of example. Embodiments of the invention may be implemented in any type of system architecture or processing environment.

Embodiments of the invention are described by way of example as applicable to systems and corresponding methods that facilitate optimizing power consumption in a mobile device. In this exemplary embodiment, logic code for performing these methods is implemented in the form of, for example, application software 1122. The logic code, in one embodiment, may be comprised of one or more modules that execute on one or more processors in a distributed or non-distributed communication model.

It should also be understood that the programs, modules, processes, methods, and the like, described herein are but an exemplary implementation and are not related, or limited, to any particular computer, apparatus, or computer programming language. Rather, various types of general-purpose computing machines or devices may be used with logic code implemented in accordance with the teachings provided, herein. Further, the order in which the steps of the present method are performed is purely illustrative in nature. In fact, the steps can be performed in any order or in parallel, unless indicated otherwise in the present disclosure.

The method of the present invention may be performed in either hardware, software, or any combination thereof. In particular, the present method may be carried out by software, firmware, or macrocode operating on a computer or computers of any type. Additionally, software embodying the present invention may comprise computer instructions and be stored in a recording medium (e.g., memory stick, ROM, RAM, magnetic media, punched tape or card, compact disk (CD), DVD, etc.). Furthermore, such software may be transmitted in the form of a computer signal embodied in a carrier wave, and through communication networks by way of Internet portals or websites, for example. Accordingly, the present invention is not limited to any particular platform, unless specifically stated otherwise in the present disclosure.

The present invention has been described above with reference to preferred embodiments. However, those skilled in the art will recognize that changes and modifications may be made in these preferred embodiments without departing from the scope of the present invention.

The embodiments described above are to be considered in all aspects as illustrative only and not restrictive in any manner. Thus, other system architectures, platforms, and implementations that can support various aspects of the invention may be utilized without departing from the essential characteristics as described herein. These and various other adaptations and combinations of features of the embodiments disclosed are within the scope of the invention. The invention is defined by the claims and their full scope of equivalents.

The invention claimed is:

1. A method for programming a mobile communication device based on a high-level code comprising operative language, the method comprising:

receiving a high-level code comprising one or more keywords, wherein the high-level code is provided by a user of a mobile communication device to control the operation of the mobile communication device without having to select from menu items provided by an operating system running on the mobile communication device;

parsing the high-level code for the keywords to recognize the operative language associated with controlling one or more operations of the mobile communication device;

determining at least one operation associated with the operative language;

determining whether high-level code comprises keywords defining one or more relationships and conditions corresponding to the operative language;

producing an executable code that can be executed by a microcontroller of the mobile communication device to perform the respective operation associated with the operative language;

determining level of complexity and implementation of the high-level code; and designating an application software to process the high level code, wherein the high-level code comprises at least one sentence formatted in accordance with a first context, wherein the high-level code is processed by a natural language compiler comprised of one or more modules executed on one or more independent computing systems, depending on the level of complexity and the implementation of the high-level code, wherein application software is executed on a distributed environment comprising the mobile communication device and a network server connected to the mobile communication device, and the application software performs the parsing and determining steps depending on implementation, and wherein when the high-level code comprises a complex structure the parsing and determining steps are performed by application software executed on a network server connected to the mobile communication device and when the high-level code comprises a less complex structure the parsing and determining steps are performed by application software executed on the mobile communication device.

2. The method of claim 1, wherein said at least one sentence comprises one or more keywords.

3. The method of claim 1, wherein the first context comprises a natural language context.

4. The method of claim 1, wherein the high-level code is contained in a script.

5. The method of claim 4, wherein the script is written by a user of the mobile communication device.

6. A system for programming a mobile communication device based on a high-level code comprising operative language, the system comprising:

means for receiving a high-level code comprising one or more keywords, wherein the high-level code is provided by a user of a mobile communication device to control the operation of the mobile communication device without having to select from menu items provided by an operating system running on the mobile communication device;

means for parsing the high-level code for the keywords to recognize the operative language associated with controlling one or more operations of the mobile communication device;

means for determining at least one operation associated with the operative language;

means for determining whether high-level code comprises keywords defining one or more relationships and conditions corresponding to the operative language; and means for producing an executable code that can be executed by a microcontroller of the mobile communication device to perform the respective operation associated with the operative language, means for determining level of complexity and implementation of the high-level code;

means for designation an application software to process the high-level code wherein the high-level code comprises at least one sentence formatted in accordance with a first context, wherein the high-level code is processed by a natural language compiler comprised of one or more modules executed on one or more independent computing systems, depending on the level of complexity and the implementation of the high-level code, wherein application software is executed on a distributed environment comprising the mobile communication device and a network server connected to the mobile communication device, and the application software performs the parsing and determining steps depending on implementation, and wherein when the high-level code comprises an complex structure the parsing and determining steps are performed by application software executed on a network server connected to the mobile communication device and when the high-level code comprises a less complex structure the parsing and determining steps are performed by application software executed on the mobile communication device.

7. The system of claim 6, wherein said at least one sentence comprises one or more keywords.

8. The system of claim 6, wherein the first context is a natural language context.

9. The system of claim 6, wherein the high-level code is contained in a script.

10. The system of claim 9, wherein the script is written by a user of the mobile communication device.

* * * * *